(12) United States Patent
Miyake et al.

(10) Patent No.: US 12,715,495 B2
(45) Date of Patent: Aug. 25, 2026

(54) TURNING CONTROL DEVICE

(71) Applicants: JTEKT CORPORATION, Kariya (JP); TOYOTA JIDOSHA KABUSHIKI KAISHA, Toyota (JP)

(72) Inventors: Junya Miyake, Okazaki (JP); Isao Namikawa, Okazaki (JP); Shunsuke Yoshida, Nisshin (JP); Yoshio Kudo, Machida (JP); Hidetsugu Toyama, Susono (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 18/236,980

(22) Filed: Aug. 23, 2023

(65) Prior Publication Data

US 2024/0067257 A1 Feb. 29, 2024

(30) Foreign Application Priority Data

Aug. 31, 2022 (JP) ................................ 2022-137700

(51) Int. Cl.
*B62D 5/04* (2006.01)
*B62D 6/00* (2006.01)
*B62D 15/02* (2006.01)

(52) U.S. Cl.
CPC ............ *B62D 5/046* (2013.01); *B62D 6/003* (2013.01); *B62D 15/0265* (2013.01)

(58) Field of Classification Search
CPC .... B62D 5/046; B62D 6/003; B62D 15/0265; B62D 6/002; B62D 5/0463; B62D 5/006
(Continued)

(56) References Cited

U.S. PATENT DOCUMENTS

2018/0079447 A1* 3/2018 Yamashita ........... B62D 5/0469
2019/0367085 A1* 12/2019 Kataoka .................. B62D 6/10
(Continued)

FOREIGN PATENT DOCUMENTS

EP 1 600 358 A2 11/2005
JP 2020-82915 A 6/2020
JP 2021-154895 A 10/2021

OTHER PUBLICATIONS

Jan. 22, 2024 extended Search Report issued in European Patent Application No. 23193233.6.

*Primary Examiner* — Scott A Reinbold
(74) *Attorney, Agent, or Firm* — Oliff PLC

(57) ABSTRACT

A turning control device includes a first processor, a second processor, a third processor, and a fourth processor. The first processor calculates a torque command value based on a difference between a target pinion angle and a pinion angle. The second processor calculates a compensation value compensating resistance of a turning mechanism based on a difference between a target pinion angular velocity and a pinion angular velocity. The third processor limits a variation range of the torque command value based on a limit value of the torque command value and limits a variation range of the compensation value based on a limit value of the compensation value. The fourth processor calculates a turning torque command value by subtracting the compensation value from the torque command value. The third processor changes the limit values based on a traveling state of a vehicle.

11 Claims, 7 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2020/0010112 | A1* | 1/2020 | Toko .................... | B62D 5/0409 |
| 2022/0009547 | A1 | 1/2022 | Osajima et al. | |
| 2022/0227412 | A1* | 7/2022 | Akatsuka ............... | B62D 5/006 |
| 2022/0315099 | A1* | 10/2022 | Maegawa ............. | H02P 29/028 |

* cited by examiner

FIG. 1

REACTION CONTROL DEVICE

TURNING CONTROL DEVICE

Figure 2:
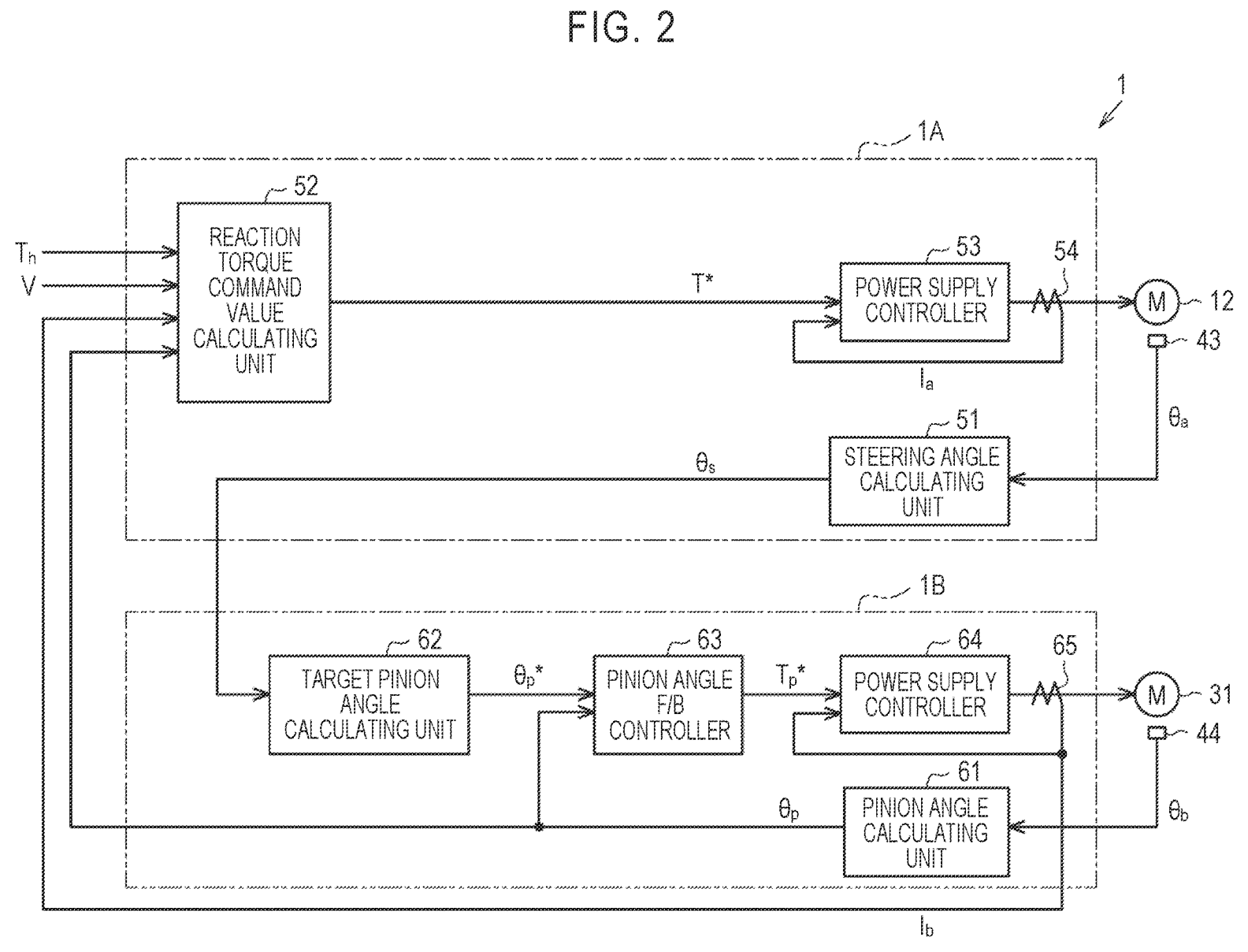

52 REACTION TORQUE COMMAND VALUE CALCULATING UNIT

53 POWER SUPPLY CONTROLLER

54

M 12

43

$\theta_a$

51 STEERING ANGLE CALCULATING UNIT $T^*$ $I_a$ $\theta_s$

1B

62 TARGET PINION ANGLE CALCULATING UNIT $\theta_p^*$

63 PINION ANGLE F/B CONTROLLER $T_p^*$

64 POWER SUPPLY CONTROLLER

65

M 31

44

$\theta_b$

61 PINION ANGLE CALCULATING UNIT $\theta_p$ $I_b$ $T_h$

Figure 3:
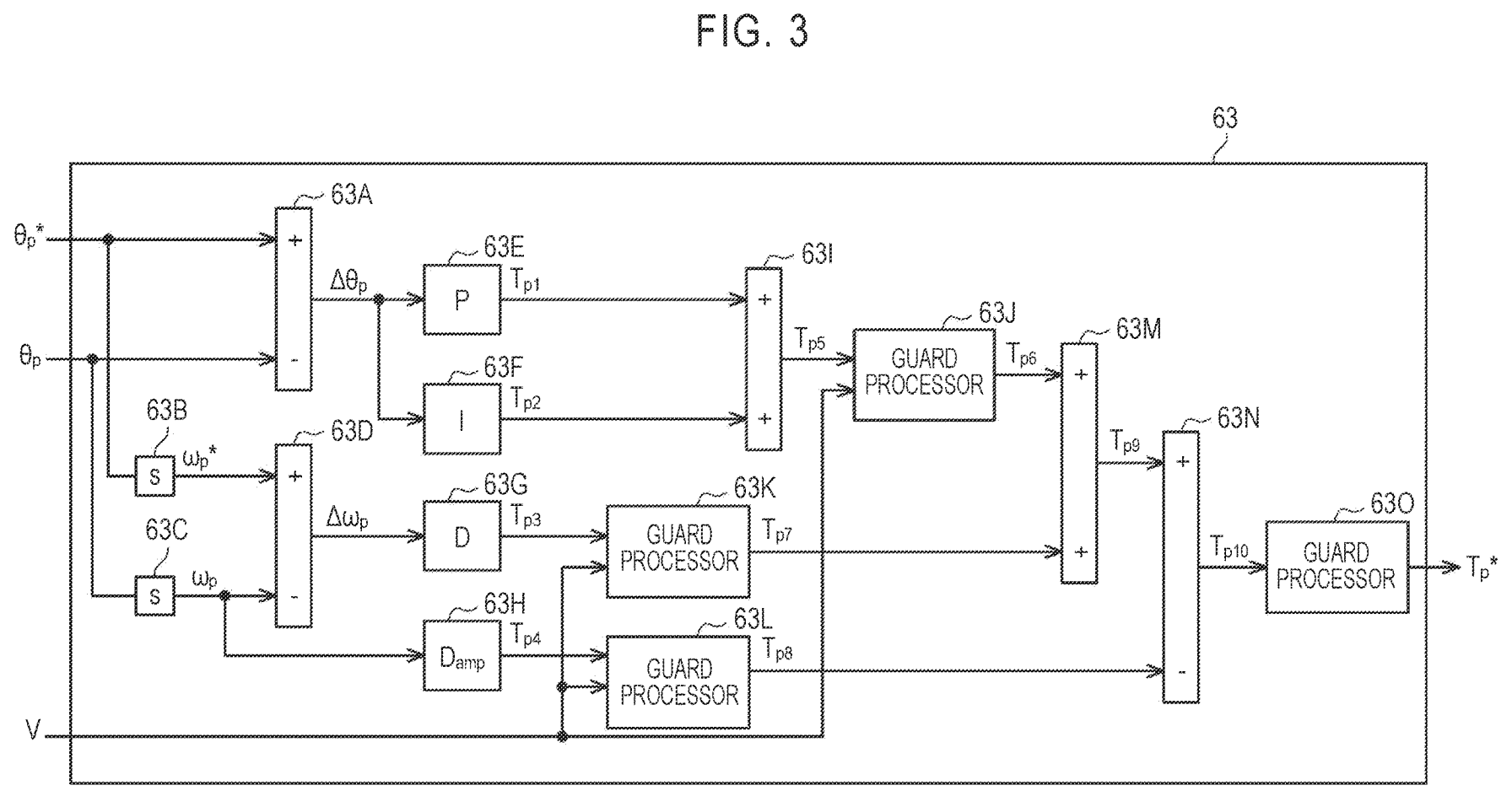

$\theta_p^*$
$\theta_p$
V

63A
$\Delta\theta_p$
63B
s
$\omega_p^*$
63C
s
$\omega_p$
63D
$\Delta\omega_p$

63E
P
$T_{p1}$
63F
I
$T_{p2}$
63G
D
$T_{p3}$
63H
$D_{amp}$
$T_{p4}$

63I
$T_{p5}$
63J
GUARD PROCESSOR
$T_{p6}$
63K
GUARD PROCESSOR
$T_{p7}$
63L
GUARD PROCESSOR
$T_{p8}$
63M
$T_{p9}$
63N
$T_{p10}$
63O
GUARD PROCESSOR
$T_p^*$ 63J
(63K, 63L, 63P, 63Q)
77
LIMITATION PROCESSOR
$T_{p6}$
$(T_{p7}, T_{p8})$
$(T_{p9}, T_{p10})$
75
X
$T_{pUL}$
76
-u
$T_{pLL}$
$T_{pth}$
74
GRADUAL CHANGE PROCESSOR
G6
73
SWITCH
G5
G4
71B
SWITCH
G3
71
G1
G2
(G7, G8)
(G9, G10)
72
F2
71A
F1
<
<
$V_{th2}$
$V_{th1}$
V
$T_{p5}$
$(T_{p3}, T_{p4})$
$(T_{p1}, T_{p2})$

Figure 8:
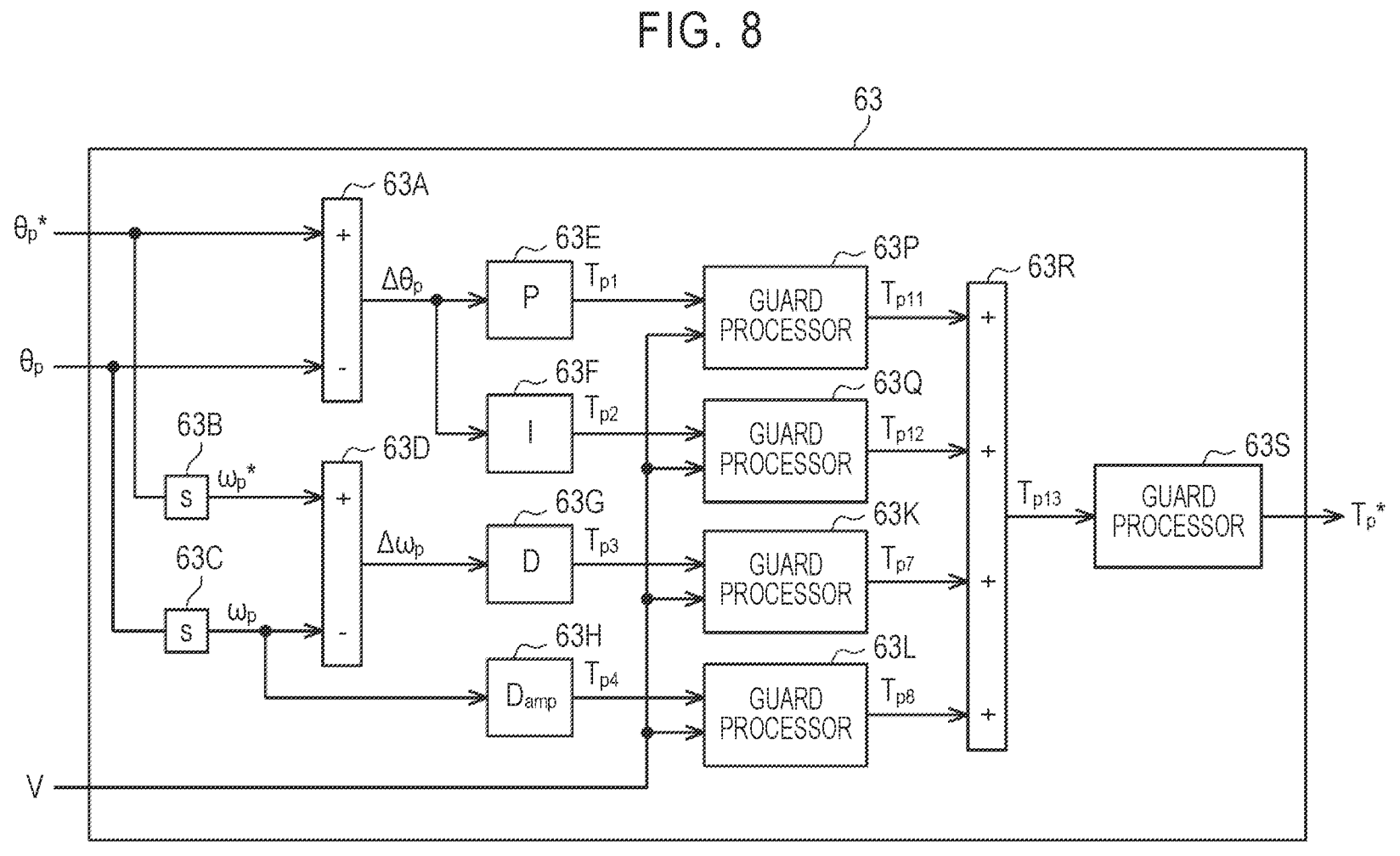

$\theta_p^*$
$\theta_p$
V 63A
63B
63C
63D
s
s
$\omega_p^*$
$\omega_p$
$\Delta\theta_p$
$\Delta\omega_p$
\+
\-
\+
\-

63E P
63F I
63G D
63H $D_{amp}$ $T_{p1}$
$T_{p2}$
$T_{p3}$
$T_{p4}$

63P GUARD PROCESSOR
63Q GUARD PROCESSOR
63K GUARD PROCESSOR
63L GUARD PROCESSOR $T_{p11}$
$T_{p12}$
$T_{p7}$
$T_{p8}$

63R
\+
\+
\+
\+

$T_{p13}$

63S GUARD PROCESSOR $T_p^*$

TURNING CONTROL DEVICE

CROSS-REFERENCE TO RELATED APPLICATION

This application claims priority to Japanese Patent Application No. 2022-137700 filed on Aug. 31, 2022, incorporated herein by reference in its entirety.

BACKGROUND

1. Technical Field

The disclosure relates to a turning control device.

2. Description of Related Art

In the related art, there is an electric power steering device that assists with operation of a steering wheel by applying a torque of a motor as an assist force to a steering shaft. A control device for the electric power steering device calculates a current command value for the motor based on a steering torque which is detected by a torque sensor. The control device controls supply of electric power to the motor based on the current command value. Accordingly, the motor generates a torque based on the steering torque.

Recently, there has been a so-called steer-by-wire steering device in which transmission of power between a steering wheel and turning wheels is cut off. This steering device includes a reaction motor that generates a steering reaction force which is applied to the steering shaft and a turning motor that generates a turning force for turning the turning wheels. A control device for the steering device generates a steering reaction force by controlling supply of electric power to the reaction motor and turns the turning wheels by controlling supply of electric power to the turning motor.

For example, a steering device described in Japanese Unexamined Patent Application Publication No. 2020-82915 (JP 2020-82915 A) can perform emergency avoidance support control. A control device for the steering device controls a motor based on information from a host control device. When there is concern about collision of a vehicle with an obstacle present in a traveling direction of the vehicle, the host control device calculates a target turning angle for moving the vehicle in a direction in which the obstacle is not present. The control device for the steering device performs feedback control such that an actual turning angle matches the target turning angle.

The control device for the steering device sets a value of a feedback gain at the time of performing of emergency avoidance support control to, for example, a value greater than the feedback gain at the time of normal traveling. This is because a higher responsiveness is required for emergency avoidance support control than normal traveling control. The feedback control is PID control and includes proportional control, integral control, and differential control. The feedback gain includes a proportional gain, an integral gain, and a differential gain.

The control device for the steering device calculates a difference between a target turning angle calculated by a host control device and an actual turning angle. The control device calculates a turning angle of turning wheels based on a rotation angle of a motor which is detected by a rotation angle sensor. The control device calculates a current command value for the motor by adding a value obtained by multiplying the difference subjected to proportional processing by the proportional gain, a value obtained by multiplying the difference subjected to integral processing by the integral gain, and a value obtained by multiplying the difference subjected to differential processing by the differential gain.

SUMMARY

The control device for the steering device may be configured to perform various types of compensation control for the current command value in order to realize a superior feeling of steering. An example of the compensation control is damping control. The control device calculates, for example, a compensation value for compensating for resistance of the steering device based on a steering speed and corrects the current command value using the calculated compensation value.

The control device for the steering device may be configured to set limit values to limit variation ranges of values calculated by performing the proportion control, the integral control, the differential control, and the damping control. The limit values include an upper limit and a lower limit for each value. When excessive values greater than the limit values are calculated by performing the control, the control device limits the calculated excessive values to appropriate values equal to or less than the limit values.

For example, there is following concern according to the limit values for the values. That is, for example, when an emergency avoidance operation is performed via a steering wheel, a value calculated by performing the proportional control or the differential control and a compensation value calculated by performing the damping control may cancel each other out. Accordingly, it may be possible not to appropriately turn the turning wheels. As a result, there is demand for appropriately turning the turning wheels according to a steering state of a steering wheel.

According to an aspect of the disclosure, there is provided a turning control device for controlling a turning motor that generates a turning force for turning wheels of a vehicle. The turning control device calculates a target angle of a rotary member rotating along with an operation of the turning wheels based on a steering state of a steering wheel and calculates a turning torque command value for the turning motor by performing feedback control such that an actual angle of the rotary member conforms to the target angle. The turning control device includes: a first processor configured to calculate a torque command value based on a difference between the target angle and the actual angle; a second processor configured to calculate a compensation value for the torque command value based on a target angular velocity or an actual angular velocity of the rotary member, the compensation value acts in a direction opposite to the torque command value; a third processor configured to perform a limitation process to limit a variation range of the torque command value based on a limit value of the torque command value and to limit a variation range of the compensation value based on a limit value of the compensation value; and a fourth processor configured to calculate the turning torque command value using the torque command value after the limitation process is performed and the compensation value after the limitation process is performed. The third processor is configured to individually increase the limit value of the torque command value and the limit value of the compensation value based on a traveling state of the vehicle.

For example, when the limit values are set to fixed values, the torque command value and the compensation value may be likely to be limited to the same value depending on the traveling state of the vehicle. In this case, there is concern that the torque command value and the compensation value may cancel each other out.

With this configuration, the limit values of the torque command value and the compensation value are individually increased according to the traveling state of the vehicle. Since the variation range of the torque command value and the variation range of the compensation value are independently enlarged according to the traveling state of the vehicle, it is possible to avoid limiting the torque command value and the compensation value to the same value and cancelling-out of the torque command value and the compensation value. Accordingly, it is possible to appropriately turn the turning wheels according to the steering state of the steering wheel.

In the turning control device, the third processor may be configured to increase the limit value of the torque command value and the limit value of the compensation value when a value of a vehicle state parameter in which the traveling state of the vehicle is reflected is greater than a predetermined threshold value.

With this configuration, when the value of the vehicle state parameter in which the traveling state of the vehicle is reflected is greater than the threshold value, the limit values of the torque command value and the compensation value are increased. Since the variation range of the torque command value and the variation range of the compensation value are independently enlarged, it is possible to avoid limiting the torque command value and the compensation value to the same value. Accordingly, it is possible to curb cancelling-out of the torque command value and the compensation value. As a result, it is possible to appropriately turn the turning wheels according to the steering state of the steering wheel.

In the turning control device, the third processor may be configured to increase the limit value of the torque command value and the limit value of the compensation value to the same value when the value of the vehicle state parameter is greater than the threshold value.

With this configuration, when the value of the vehicle state parameter is greater than the threshold value, the limit values of the torque command value and the compensation value are increased to the same value. Accordingly, the variation range of the torque command value and the variation range of the compensation value are independently enlarged. Since limiting the torque command value and the compensation value to the same value is avoided, it is possible to avoid cancelling-out of the torque command value and the compensation value. As a result, it is possible to appropriately turn the turning wheels according to the steering state of the steering wheel.

In the turning control device, the third processor may be configured to increase the limit value of the torque command value and the limit value of the compensation value to different values when the value of the vehicle state parameter is greater than the threshold value.

With this configuration, when the value of the vehicle state parameter is greater than the threshold value, the limit values of the torque command value and the compensation value are increased to different values. Accordingly, the variation range of the torque command value and the variation range of the compensation value are independently enlarged. Since limiting the torque command value and the compensation value to the same value is avoided, it is possible to avoid cancelling-out of the torque command value and the compensation value. As a result, it is possible to appropriately turn the turning wheels according to the steering state of the steering wheel.

In the turning control device, the limit value of the torque command value may be greater than the limit value of the compensation value. With this configuration, when the value of the vehicle state parameter is greater than the threshold value, the torque command value can be better reflected in the turning torque command value.

In the turning control device, the third processor may be configured to increase the limit value of the torque command value and the limit value of the compensation value with an increase in the value of the vehicle state parameter when the value of the vehicle state parameter is greater than the threshold value.

With this configuration, it is possible to appropriately increase the limit values according to the value of the vehicle state parameter. In the turning control device, the value of the vehicle state parameter may be a value of a vehicle speed detected by an onboard sensor, a value of a yaw rate, a value of a ratio of the actual angle to the target angle, or a value of a ratio of the actual angular velocity to the target angular velocity. The traveling state of the vehicle is reflected in such values.

In the turning control device, the third processor may be configured to determine that an emergency avoidance operation using the steering wheel is likely to be performed when the value of the vehicle state parameter is greater than the threshold value.

With this configuration, whether an emergency avoidance operation using the steering wheel is likely to be performed can be determined through comparison between the vehicle state parameter and the threshold value. When an emergency avoidance operation is performed, it is possible to appropriately turn the turning wheels according to the steering state of the steering wheel.

In the turning control device, the third processor may include a gradual change processor configured to gradually change the limit value of the torque command value and the limit value of the compensation value with time by performing a gradual change process on the limit value of the torque command value and the limit value of the compensation value.

With this configuration, since sudden change of the limit values is avoided, it is possible to curb sudden change of the torque command value and the compensation value and sudden change of the turning torque command value. Accordingly, it is possible to curb sudden change of the turning force generated by the turning motor.

In the turning control device, the torque command value may include a first torque command value with a value proportional to the difference and a second torque command value with a value proportional to an integral value of the difference. The first torque command value is calculated by performing a proportional operation on the difference and the second torque command value is calculated by performing an integral operation on the difference. In this case, the third processor may be configured to limit a variation range of a summed value of the first torque command value and the second torque command value based on a limit value of the summed value.

With this configuration, the limit values of the summed value of the first torque command value and the second torque command value and the compensation value are increased according to the traveling state of the vehicle. Since the variation range of the summed value and the variation range of the compensation value are independently enlarged, it is possible to avoid limiting the summed value and the compensation value to the same value. Accordingly, it is possible to avoid cancelling-out of the summed value and the compensation value. As a result, it is possible to appropriately turn the turning wheels according to the steering state of the steering wheel.

In the turning control device, the torque command value may include a first torque command value with a value proportional to the difference and a second torque command value with a value proportional to an integral value of the difference. The first torque command value is calculated by performing a proportional operation on the difference and the second torque command value is calculated by performing an integral operation on the difference. In this case, the third processor may be configured to limit a variation range of the first torque command value based on a limit value of the first torque command value and limit a variation range of the second torque command value based on a limit value of the second torque command value.

With this configuration, the limit values of the first torque command value, the second torque command value, and the compensation value are increased according to the traveling state of the vehicle. Since the variation range of the first torque command value, the variation range of the second torque command value, and the variation range of the compensation value are independently enlarged, it is possible to avoid limiting the first torque command value, the second torque command value, and the compensation value to the same value. Accordingly, it is possible to avoid cancelling-out of the first torque command value and the compensation value and cancelling-out of the second torque command value and the compensation value. As a result, it is possible to appropriately turn the turning wheels according to the steering state of the steering wheel.

With the turning control device according to the disclosure, it is possible to appropriately turn the turning wheels according to a steering state of a steering wheel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a configuration of a steering device in which a turning control device according to a first embodiment is mounted;

FIG. 2 is a block diagram illustrating a reaction control device and the turning control device according to the first embodiment;

FIG. 3 is a block diagram illustrating a pinion angle feedback controller according to the first embodiment;

FIG. 8 is a block diagram illustrating a pinion angle feedback controller according to a second embodiment;

DETAILED DESCRIPTION OF EMBODIMENTS

Entire Configuration

Figure 1:
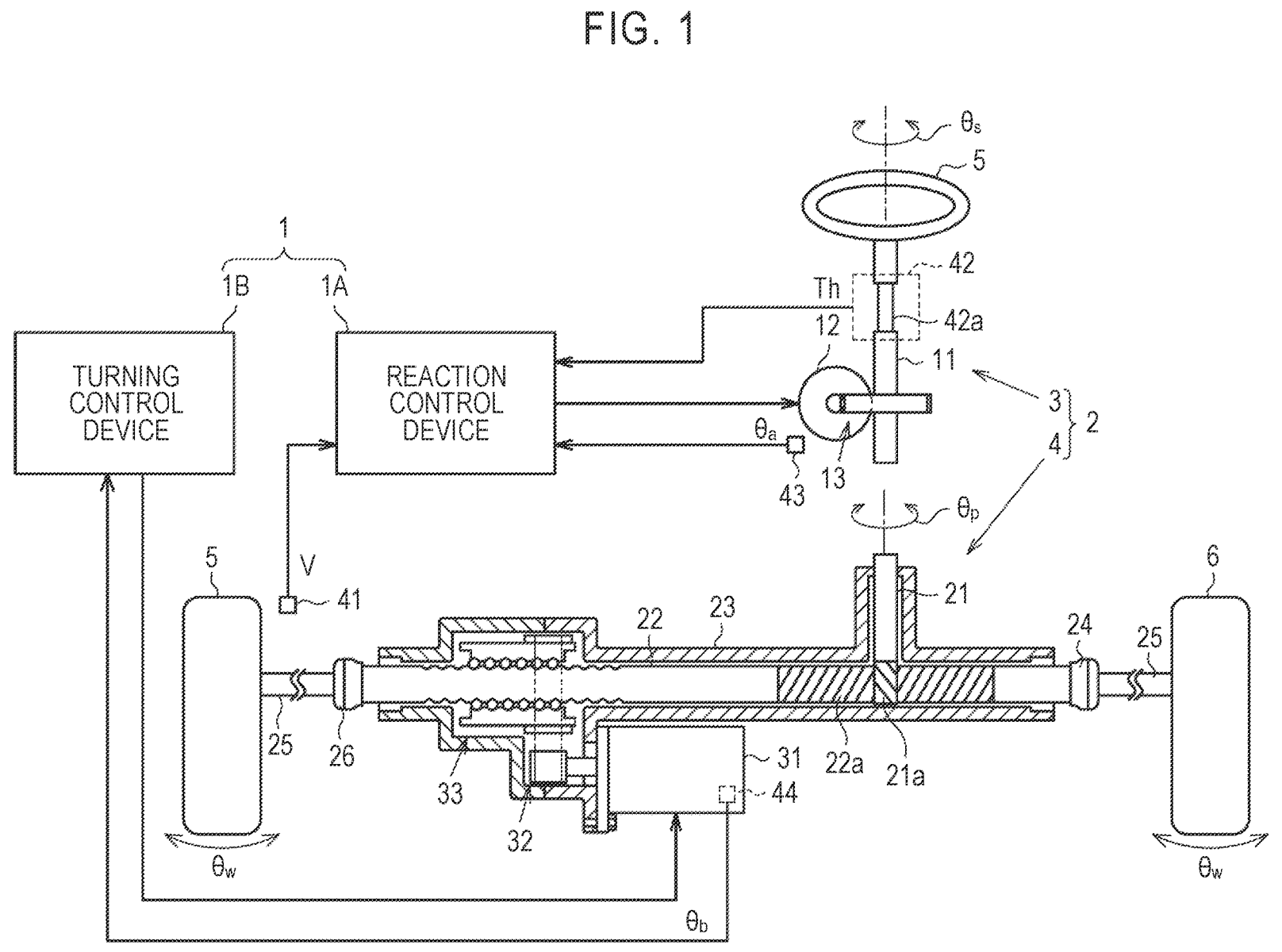
Figure 4:
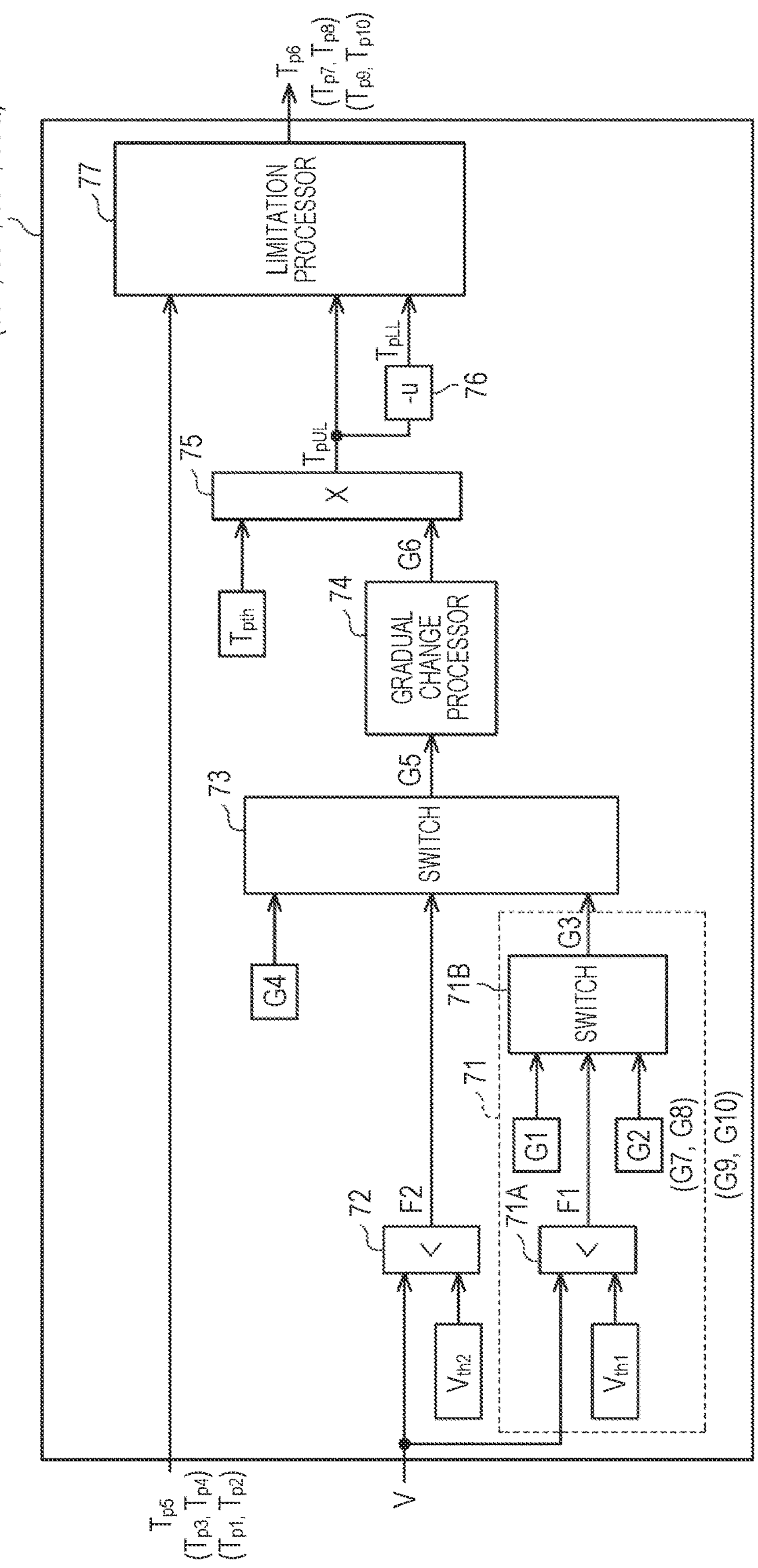
FIG. 4 is a block diagram illustrating first to third guard processors according to the first embodiment.

Hereinafter, a turning control device according to a first embodiment will be described. As illustrated in FIG. 1, a control target of a steering control device 1 is a steer-by-wire steering device 2. The steering device 2 includes a steering mechanism 3 and a turning mechanism 4. The steering mechanism 3 is a mechanism part that is steered by a driver using a steering wheel 5. The turning mechanism 4 is a mechanism part that turns turning wheels 6 of a vehicle in accordance with steering of the steering wheel 5. The steering control device 1 includes a reaction control device 1A and a turning control device 1B. A control target of the reaction control device 1A is the steering mechanism 3. The reaction control device 1A performs reaction control. A control target of the turning control device 1B is the turning mechanism 4. The turning control device 1B performs turning control.

The steering mechanism 3 includes a steering shaft 11, a reaction motor 12, and a reduction gear 13. The steering wheel 5 is connected to the steering shaft 11 such that both can rotate together. The reaction motor 12 is a source of a steering reaction force which is applied to the steering shaft 11. The steering reaction force is a force in a direction opposite to a steering direction of the steering wheel 5. The reaction motor 12 is, for example, a three-phase brushless motor. The reduction gear 13 reduces rotation of the reaction motor 12 and transmits the reduced rotation to the steering shaft 11.

The turning mechanism 4 includes a pinion shaft 21, a turning shaft 22, and a housing 23. The housing 23 rotatably supports the pinion shaft 21. The housing 23 accommodates the turning shaft 22 such that it can move translationally. The pinion shaft 21 is provided to join the turning shaft 22. Pinion teeth 21*a* of the pinion shaft 21 engage with rack teeth 22*a* of the turning shaft 22. Tie rods 25 are connected to both ends of the turning shaft 22 via rack ends 24 including a ball joint. Tips of the tie rods 25 are connected to knuckles (not illustrated) assembled into the turning wheels 6.

The turning mechanism 4 includes a turning motor 31, a power transmission mechanism 32, and a conversion mechanism 33. The turning motor 31 is a source of a turning force which is applied to the turning shaft 22. The turning force is a force for turning the turning wheels 6. The turning motor 31 is, for example, a three-phase brushless motor. The power transmission mechanism 32 is, for example, a belt power transmission mechanism. The power transmission mechanism 32 transmits rotation of the turning motor 31 to the conversion mechanism 33. The conversion mechanism 33 is, for example, a ball screw mechanism. The conversion mechanism 33 converts rotation transmitted from the power transmission mechanism 32 to a motion in an axial direction of the turning shaft 22.

When the turning shaft 22 moves in the axial direction, a turning angle $\theta_w$ of the turning wheels 6 is changed. Since the pinion teeth 21*a* of the pinion shaft 21 engages with the rack teeth 22*a* of the turning shaft 22, the pinion shaft 21 rotates along with movement of the turning shaft 22. The pinion shaft 21 is a rotary member that rotates along with a turning operation of the turning wheels 6.

The reaction control device 1A controls the operation of the reaction motor 12. The reaction control device 1A includes a processing circuit having one of the following configurations A1, A2, and A3. A1. One or more processors operating in accordance with a computer program which is software. The processor includes a central processing unit (CPU) and a memory.

A2. One or more dedicated hardware circuits such as an application-specific integrated circuit (ASIC) performing at least some of various processes. The ASIC includes a CPU and a memory.

A3. A hardware circuit in which the configurations A1 and A2 are combined. The memory is a computer-readable medium and stores a program in which processes or commands for a computer are described. In this embodiment the computer is a CPU. The memory includes a random access memory (RAM) and a read only memory (ROM). The CPU performs various types of control by executing the program stored in the memory in a predetermined operation cycle.

The reaction control device 1A receives a result of detection from an onboard sensor. The sensor includes a vehicle speed sensor 41, a torque sensor 42, and a rotation angle sensor 43. The vehicle speed sensor 41 detects a vehicle speed V. The vehicle speed V is a vehicle state quantity in which a traveling state of the vehicle is reflected. The torque sensor 42 is provided in the steering shaft 11. The torque sensor 42 is located on the steering wheel 5 side with respect to a connection part of the reduction gear 13 in the steering shaft 11. The torque sensor 42 detects a steering torque Th which is applied to the steering shaft 11. The steering torque Th is calculated based on an amount of torsion of a torsion bar 42*a* provided in the steering shaft 11. The rotation angle sensor 43 is provided in the reaction motor 12. The rotation angle sensor 43 detects a rotation angle $\theta_a$ of the reaction motor 12.

The steering torque Th and the rotation angle $\theta_a$ of the reaction motor 12 have, for example, a positive value when the steering wheel 5 is turned to the right and a negative value when the steering wheel 5 is turned to the left.

The reaction control device 1A controls the operation of the reaction motor 12 using results of detection from the vehicle speed sensor 41, the torque sensor 42, and the rotation angle sensor 43. The reaction control device 1A controls supply of electric power to the reaction motor 12 such that the reaction motor 12 generates a steering reaction force corresponding to the steering torque Th.

The turning control device 1B controls the operation of the turning motor 31. The turning control device 1B includes a processing circuit having one of the aforementioned three configurations A1, A2, and A3 similarly to the reaction control device 1A.

The turning control device 1B receives a result of detection from an onboard sensor. The sensor includes a rotation angle sensor 44. The rotation angle sensor 44 is provided in the turning motor 31. The rotation angle sensor 44 detects a rotation angle $\theta_b$ of the turning motor 31. The rotation angle $\theta_b$ of the turning motor 31 has, for example, a positive value when the steering wheel 5 is turned to the right and a negative value when the steering wheel 5 is turned to the left.

The turning control device 1B controls the operation of the turning motor 31 using the result of detection from the rotation angle sensor 44. The turning control device 1B controls supply of electric power to the turning motor 31 such that the turning wheels 6 are turned according to a steering state of the steering wheel 5.

Configuration of Reaction Control Device 1A

The configuration of the reaction control device 1A will be described below. As illustrated in FIG. 2, the reaction control device 1A includes a steering angle calculating unit 51, a reaction torque command value calculating unit 52, and a power supply controller 53.

The steering angle calculating unit 51 calculates a steering angle θs of the steering wheel 5 based on the rotation angle $\theta_a$ of the reaction motor 12 detected by the rotation angle sensor 43. The reaction torque command value calculating unit 52 calculates a reaction torque command value T* based on the steering torque Th and the vehicle speed V. The reaction torque command value T* is a target value of a steering reaction force to be generated by the reaction motor 12. The steering reaction force is a torque opposite to a steering direction of the steering wheel 5. The absolute value of the reaction torque command value T* becomes greater as the absolute value of the steering torque Th becomes greater and the vehicle speed V becomes lower.

The power supply controller 53 supplies electric power corresponding to the reaction torque command value T* to the reaction motor 12. Specifically, the power supply controller 53 calculates a current command value for the reaction motor 12 based on the reaction torque command value T*. The power supply controller 53 detects a value of a current $I_a$ flowing in a power supply path using a current sensor 54 provided in the power supply path to the reaction motor 12. The value of the current $I_a$ is a value of a current supplied to the reaction motor 12. The power supply controller 53 calculates a difference between the current command value and the value of the current $I_a$ and controls supply of electric power to the reaction motor 12 such that the difference is cancelled. Accordingly, the reaction motor 12 generates a torque corresponding to the reaction torque command value T*.

Configuration of Turning Control Device 1B

The configuration of the turning control device 1B will be described below. As illustrated in FIG. 2, the turning control device 1B includes a pinion angle calculating unit 61, a target pinion angle calculating unit 62, a pinion angle feedback controller 63, and a power supply controller 64.

The pinion angle calculating unit 61 calculates a pinion angle $\theta_p$ based on the rotation angle $\theta_b$ of the turning motor 31 detected by the rotation angle sensor 43. The pinion angle $\theta_p$ is a rotation angle of the pinion shaft 21. The turning motor 31 and the pinion shaft 21 interlock with each other via the power transmission mechanism 32, the conversion mechanism 33, and the turning shaft 22. Accordingly, there is a correlation between the rotation angle $\theta_b$ of the turning motor 31 and the pinion angle $\theta_p$. The pinion angle $\theta_p$ can be calculated from the rotation angle $\theta_b$ of the turning motor 31 using the correlation. The pinion shaft 21 engages with the turning shaft 22. Accordingly, there is also a correlation between the pinion angle $\theta_p$ and an amount of movement of the turning shaft 22. That is, the pinion angle $\theta_p$ has a value in which the turning angle $\theta_w$ of the turning wheels 6 is reflected.

The target pinion angle calculating unit 62 calculates a target pinion angle $\theta_p$*based on the steering angle $\theta_s$ calculated by the steering angle calculating unit 51. The target pinion angle calculating unit 62 calculates the target pinion angle $\theta_p$ such that a steering angle ratio which is set according to product specifications or the like is realized. The steering angle ratio is a ratio of the turning angle $\theta_w$ to the steering angle $\theta_s$.

For example, the target pinion angle calculating unit 62 sets the steering angle ratio according to the traveling state of the vehicle such as the vehicle speed V and calculates the target pinion angle $\theta_p$* based on the set steering angle ratio. The target pinion angle calculating unit 62 calculates the target pinion angle $\theta_p$* such that the turning angle $\theta_w$ relative to the steering angle $\theta_s$ becomes greater as the vehicle speed V becomes lower. The target pinion angle calculating unit 62 calculates the target pinion angle $\theta_p$* such that the turning angle $\theta_w$ relative to the steering angle $\theta_s$ becomes less as the vehicle speed V becomes higher. The target pinion angle calculating unit 62 calculates a correction angle for the steering angle $\theta_s$ to realize the steering angle ratio set according to the traveling state of the vehicle and calculates the target pinion angle $\theta_p$* according to the steering angle ratio by adding the calculated correction angle to the steering angle $\theta_s$.

According to product specifications or the like, the target pinion angle calculating unit 62 may calculate the target pinion angle $\theta_p$* such that the steering angle ratio is "1:1" regardless of the traveling state of the vehicle.

The pinion angle feedback controller 63 receives the target pinion angle $\theta_p$* calculated by the target pinion angle calculating unit 62 and the pinion angle $\theta_p$ calculated by the pinion angle calculating unit 61. The pinion angle feedback controller 63 calculates a turning torque command value $T_p$* through feedback control of the pinion angle $\theta_p$ such that the pinion angle $\theta_p$ follows the target pinion angle $\theta_p$*. The turning torque command value $T_p$* is a command value for a torque generated by the turning motor 31 and is a target value of the turning force.

The power supply controller 64 supplies electric power corresponding to the turning torque command value $T_p$* to the turning motor 31. Specifically, the power supply controller 64 calculates a current command value for the turning motor 31 based on the turning torque command value $T_p$*. The power supply controller 64 detects a value of a current $I_b$ flowing in a power supply path using a current sensor 65 provided in the power supply path to the turning motor 31. The value of the current $I_b$ is a value of a current supplied to the turning motor 31. The power supply controller 64 calculates a difference between the current command value and the value of the current $I_b$ and controls supply of electric power to the turning motor 31 such that the difference is cancelled. Accordingly, the turning motor 31 generates a torque corresponding to the turning torque command value $T_p$*.

Configuration of Pinion Angle Feedback Controller 63

The configuration of the pinion angle feedback controller 63 will be described below. As illustrated in FIG. 3, the pinion angle feedback controller 63 includes a first subtractor 63A, a first differentiator 63B, a second differentiator 63C, and a second subtractor 63D.

The first subtractor 63A receives the target pinion angle $\theta_p$* calculated by the target pinion angle calculating unit 62 and the pinion angle 9, calculated by the pinion angle calculating unit 61. The first subtractor 63A calculates an angle difference $\Delta\theta_p$. The angle difference $\Delta\theta_p$ is a difference between the target pinion angle $\theta_p$* and the pinion angle $\theta_p$.

The first differentiator 63B calculates a target pinion angular velocity $\omega_p$* by differentiating the target pinion angle $\theta_p$* calculated by the target pinion angle calculating unit 62. The second differentiator 63C calculates a pinion angular velocity $\omega_p$ by differentiating the pinion angle $\theta_p$ calculated by the pinion angle calculating unit 61.

The second subtractor 63D receives the target pinion angular velocity $\omega_p$* calculated by the first differentiator 63B and the pinion angular velocity $\omega_p$ calculated by the second differentiator 63C. The second subtractor 63D calculates an angular velocity difference $\Delta\omega_p$. The angular velocity difference $\Delta\omega_p$ is a difference between the target pinion angular velocity $\omega_p$* and the pinion angular velocity $\omega_p$.

The pinion angle feedback controller 63 includes a proportional controller 63E, an integral controller 63F, a differential controller 63G, and a damping controller 63H. The proportional controller 63E calculates a first torque command value $T_{p1}$ with a value proportional to the angle difference $\Delta\theta_p$ by performing a proportional operation on the angle difference $\Delta\theta_p$ calculated by the first subtractor 63A. The proportional controller 63E calculates the first torque command value $T_{p1}$ by multiplying the angle difference $\Delta\theta_p$ by a proportional gain. The proportional gain is a constant that is turned to realize control characteristics.

The integral controller 63F calculates a second torque command value $T_{p2}$ with a value proportional to an integral value of the angle difference $\Delta\theta_p$ by performing an integral operation on the angle difference 66 $\theta_p$ calculated by the first subtractor 63A. The integral controller 63F calculates the second torque command value $T_{p2}$ by integrating the angle difference 66 $\theta_p$ with respect to time and multiplying the integral value by an integral gain. The integral gain is a constant that is tuned to realize required control characteristics.

The differential controller 63G calculates a third torque command value $T_{p3}$ with a value proportional to a differential value of the angular velocity difference $\Delta\omega_p$ by performing a differential operation on the angular velocity difference $\Delta\omega_p$ calculated by the second subtractor 63D. The differential controller 63G calculates the third torque command value $T_{p3}$ by differentiating the angular velocity difference $\Delta\omega_p$ with respect to time and multiplying the differential value by a differential gain. The differential gain is a constant that is tuned to realize required control characteristics.

The damping controller 63H receives the pinion angular velocity $\omega_p$ calculated by the second differentiator 63C and calculates a fourth torque command value $T_{p4}$ which is a compensation value for compensating for resistance of the turning mechanism 4 based on the received pinion angular velocity $\omega_p$. The fourth torque command value $T_{p4}$ is a compensation value that is calculated to curb the pinion angular velocity $\omega_p$, that is, to curb a turning angle velocity of the turning wheels 6. The fourth torque command value $T_p$ is a compensation value for the first torque command value $T_{p1}$, the second torque command value $T_{p2}$, and the third torque command value $T_{p3}$. The fourth torque command value $T_p$ is mainly a compensation value for the first torque command value $T_{p1}$.

The fourth torque command value $T_{p4}$ is a compensation value that acts in a direction opposite to the first torque command value $T_{p1}$, the second torque command value $T_{p2}$, and the third torque command value $T_{p3}$ or a summed value of the first torque command value $T_{p1}$, the second torque command value $T_{p2}$, and the third torque command value $T_{p3}$. The fourth torque command value $T_4$ acts through third subtractor 63N which will be described later. In addition, the damping controller 63H may calculate the fourth torque command value $T_{p4}$ based on the target pinion angular velocity $\omega_p$* calculated by the first differentiator 63B.

The pinion angle feedback controller 63 includes a first adder 63I, a first guard processor 63J, a second guard processor 63K, and a third guard processor 63L. The first adder 63I receives the first torque command value $T_{p1}$ calculated by the proportional controller 63E and the second torque command value $T_{p2}$ calculated by the integral controller 63F. The first adder 63I calculates a fifth torque command value $T_{p5}$ by summing the first torque command value $T_{p1}$ and the second torque command value $T_{p2}$. The fifth torque command value $T_{p5}$ is a summed value of the first torque command value $T_{p1}$ and the second torque command value $T_{p2}$.

The first guard processor 63J receives the fifth torque command value $T_{p5}$ calculated by the first adder 63I and the vehicle speed V detected by the vehicle speed sensor 41. The first guard processor 63J calculates a limit value for the fifth torque command value $T_{p5}$ based on the vehicle speed V. The limit value includes an upper limit and a lower limit for the fifth torque command value $T_{p5}$. The first guard processor 63J performs a limitation process on the fifth torque command value $T_{p5}$ based on the upper limit and the lower limit. The first guard processor 63J calculates a sixth torque command value $T_{p6}$ by performing the limitation process.

The first guard processor 63J compares the fifth torque command value $T_{p5}$ with the upper limit. When the fifth torque command value $T_{p5}$ is greater than the upper limit, the first guard processor 63J limits the fifth torque command value $T_{p5}$ to the upper limit. The fifth torque command value $T_{p5}$ limited to the upper limit becomes the sixth torque command value $T_{p6}$.

The first guard processor 63J compares the fifth torque command value $T_{p5}$ with the lower limit. When the fifth torque command value $T_{p5}$ is less than the lower limit, the first guard processor 63J limits the fifth torque command value $T_{p5}$ to the lower limit. The fifth torque command value $T_{p5}$ limited to the lower limit becomes the sixth torque command value $T_{p6}$.

When the fifth torque command value $T_{p5}$ is between the upper limit and the lower limit, the fifth torque command value $T_{p5}$ calculated by the first adder 63I becomes the sixth torque command value $T_{p6}$ without any change.

The second guard processor 63K receives the third torque command value $T_{p3}$ calculated by the differential controller 63G and the vehicle speed V detected by the vehicle speed sensor 41. The second guard processor 63K calculates a limit value for the third torque command value $T_{p3}$ based on the vehicle speed V. The limit value includes an upper limit and a lower limit for the third torque command value $T_{p3}$. The second guard processor 63K performs a limitation process on the third torque command value $T_{p3}$ based on the upper limit and the lower limit. The second guard processor 63K calculates a seventh torque command value $T_{p7}$ by performing the limitation process.

The third guard processor 63L receives the fourth torque command value $T_{p4}$ calculated by the damping controller 63H and the vehicle speed V detected by the vehicle speed sensor 41. The third guard processor 63L calculates a limit value for the fourth torque command value $T_{p4}$ based on the vehicle speed V. The limit value includes an upper limit and a lower limit for the fourth torque command value $T_{p4}$. The third guard processor 63L performs a limitation process on the fourth torque command value $T_{p4}$ based on the upper limit and the lower limit. The third guard processor 63L calculates an eighth torque command value $T_{p8}$ by performing the limitation process.

The pinion angle feedback controller 63 includes a second adder 63M, a third subtractor 63N, and a fourth guard processor 630. The second adder 63M receives the sixth torque command value $T_{p5}$ calculated by the first guard processor 63J and the seventh torque command value $T_{p7}$ calculated by the second guard processor 63K. The second adder 63M calculates a ninth torque command value $T_{p9}$ by adding the sixth torque command value $T_{p6}$ and the seventh torque command value $T_{p7}$.

The third subtractor 63N receives the ninth torque command value $T_{p9}$ calculated by the second adder 63M and the eighth torque command value $T_{p8}$ calculated by the third guard processor 63L. The third subtractor 63N calculates a tenth torque command value $T_{p10}$ by subtracting the eighth torque command value $T_{p8}$ from the ninth torque command value $T_{p9}$.

The fourth guard processor 630 receives the tenth torque command value $T_{p10}$ calculated by the third subtractor 63N. The fourth guard processor 630 includes a limit value for the tenth torque command value $T_{p10}$. The limit value includes an upper limit and a lower limit for the tenth torque command value $T_{p10}$. The fourth guard processor 630 performs a limitation process on the tenth torque command value $T_{p10}$ based on the upper limit and the lower limit. The fourth guard processor 630 calculates a final turning torque command value $T_p$* that is used to control the turning motor 31 by performing the limitation process.

The target pinion angle $\theta_p$* corresponds to a target angle of a rotary member rotating along with the operation of the turning wheels 6. The pinion angle $\theta_p$ corresponds to an actual angle of the rotary member. The target pinion angular velocity $\omega_p$* corresponds to a target angular velocity of the rotary member. The pinion angular velocity $\omega_p$ corresponds to an actual angular velocity of the rotary member. The proportional controller 63E, the integral controller 63F, and the differential controller 63G constitute a first processor. The damping controller 63H constitutes a second processor. The first guard processor 63J, the second guard processor 63K, and the third guard processor 63L constitute a third processor. The third subtractor 63N constitutes a fourth processor.

Configuration of First to Third Guard Processors 63J, 63K, and 63L

The configuration of the first to third guard processors 63J, 63K, and 63L will be described below. The first to third guard processors 63J, 63K, and 63L have basically the same configuration.

As illustrated in FIG. 4, the first guard processor 63J includes a setting unit 71. The setting unit 71 includes a first determination unit 71A and a first switch 71B. The first determination unit 71A receives the vehicle speed V detected by the vehicle speed sensor 41 and a first vehicle speed threshold value $V_{th1}$ stored in the memory. The first vehicle speed threshold value $V_{th1}$ is set with respect to a traveling speed of the vehicle at which an emergency avoidance operation is likely to be performed using the steering wheel 5. The first vehicle speed threshold value $V_{th1}$ is a vehicle speed in a so-called low-speed range and is set to, for example, 20 km/h. This is because, for example, when the vehicle is traveling at a speed in a very low-speed range equal to or lower than 5 km/h, there is a low likelihood that the emergency avoidance operation will be performed. In addition, the low-speed range is, for example, a speed range equal to or higher than 0 km/h and less than 40 km/h.

The first determination unit 71A determines whether the emergency avoidance operation is likely to be performed based on a result of comparison between the vehicle speed V and the first vehicle speed threshold value $V_{th1}$. The first determination unit 71A sets a value of a first flag F1 based on the result of comparison between the vehicle speed V and the first vehicle speed threshold value $V_{th1}$. When the value of the vehicle speed V is less than the first vehicle speed threshold value $V_{th1}$, the first determination unit 71A determines that the emergency avoidance operation is not likely to be performed and sets the value of the first flag F1 to "0." When the value of the vehicle speed V is greater than the first vehicle speed threshold value $V_{th1}$, the first determination unit 71A determines that the emergency avoidance operation is likely to be performed and sets the value of the first flag F1 to "1."

The first switch 71B receives a first set value G1 stored in the memory and a second set value G2 stored in the memory as data inputs. The first set value G1 is a fixed value and is, for example, "1." The second set value G2 is a value specific to the first guard processor 63J. The second set value G2 is a fixed value and is set to a value greater than "1."

The first switch 71B receives the value of the first flag F1 set by the first determination unit 71A as a control input. The first switch 71B sets a value of a third set value G3 based on the value of the first flag F1. The first switch 71B selects the first set value G1 ("1" herein) as the third set value G3 when the value of the first flag F1 is "0." The first switch 71B sets the second set value G2 as the third set value G3 when the value of the first flag F1 is "1."

The first guard processor 63J includes a second determination unit 72, a second switch 73, a gradual change processor 74, a multiplier 75, a sign inversion processor 76, and a limitation processor 77. The second determination unit 72 receives the vehicle speed V detected by the vehicle speed sensor 41 and a second vehicle speed threshold value $V_{th2}$ stored in the memory. The second vehicle speed threshold value $V_{th2}$ is set with respect to a traveling speed of the vehicle at which the emergency avoidance operation is likely to be performed using the steering wheel 5. The second vehicle speed threshold value $V_{th2}$ is set to a vehicle speed in a so-called low-speed range. The second vehicle speed threshold value $V_{th2}$ may be the same value as the first vehicle speed threshold value $V_{th1}$.

The second determination unit 72 determines whether the emergency avoidance operation is likely to be performed based on a result of comparison between the vehicle speed V and the second vehicle speed threshold value $V_{th2}$. The second determination unit 72 sets a value of a second flag F2 based on the result of comparison between the vehicle speed V and the second vehicle speed threshold value $V_{th2}$. When the value of the vehicle speed V is less than the second vehicle speed threshold value $V_{th2}$, the second determination unit 72 determines that the emergency avoidance operation is not likely to be performed and sets the value of the second flag F2 to "0." When the value of the vehicle speed V is greater than the second vehicle speed threshold value $V_{th2}$, the second determination unit 72 determines that the emergency avoidance operation is likely to be performed and sets the value of the second flag F2 to "1."

The second switch 73 receives a third set value G3 set by the first switch 71B and a fourth set value G4 stored in the memory as data inputs. The fourth set value G4 is a fixed value and is, for example, "1."

The second switch 73 receives the value of the second flag F2 set by the second determination unit 72 as a control input. The second switch 73 sets a value of a fifth set value G5 based on the value of the second flag F2. The second switch 73 selects the fourth set value G4 ("1" herein) as the fifth set value G5 when the value of the second flag F2 is "0." The second switch 73 sets the third set value G3 as the fifth set value G5 when the value of the second flag F2 is "1."

The gradual change processor 74 receives the fifth set value G5 selected by the second switch 73. The gradual change processor 74 calculates a sixth set value G6 by performing a gradual change process with respect to time on the fifth set value G5. The gradual change process is a process of gradually changing the fifth set value G5. The gradual change processor 74 is configured to perform, for example, a so-called temporal change guard process of limiting a change per unit time of the fifth set value G5 to a predetermined limit value. The sixth set value G6 is finally set to the fifth set value G5. In addition, a low-pass filter may be employed as the gradual change processor 74.

The multiplier 75 receives a basic limit value $T_{pth}$ stored in the memory and the sixth set value G6 calculated by the gradual change processor 74. The basic limit value $T_{pth}$ is a basic limit value for the fifth torque command value $T_{p5}$ and is set to, for example, a rated torque of the turning motor 31. The basic limit value $T_{pth}$ is stored as a default value in the memory. The multiplier 75 calculates an upper limit $T_{pUL}$ by multiplying the basic limit value $T_{pth}$ by the sixth set value G6 calculated by the gradual change processor 74.

The sign inversion processor 76 receives the upper limit $T_{pUL}$ calculated by the multiplier 75. The sign inversion processor 76 calculates a lower limit $T_{pLL}$ by inverting the sign of the upper limit $T_{pUL}$.

The limitation processor 77 receives the upper limit $T_{pUL}$ calculated by the multiplier 75 and the lower limit $T_{pLL}$ calculated by the sign inversion processor 76. The limitation processor 77 performs a limitation process of the fifth torque command value $T_{p5}$ using the received upper limit $T_{pUL}$ and the received lower limit $T_{pLL}$.

The limitation processor 77 compares the fifth torque command value $T_{p5}$ and the upper limit $T_{pUL}$. The limitation processor 77 limits the fifth torque command value $T_{p5}$ to the upper limit $T_{pUL}$ when the fifth torque command value $T_{p5}$ is greater than the upper limit $T_{pUL}$. The fifth torque command value $T_{p5}$ limited to the upper limit $T_{pUL}$ becomes a sixth torque command value $T_{p6}$.

The limitation processor 77 compares the fifth torque command value $T_{p5}$ and the lower limit $T_{pLL}$. The limitation processor 77 limits the fifth torque command value $T_{p5}$ to the lower limit $T_{pLL}$ when the fifth torque command value $T_{p5}$ is less than the lower limit $T_{pLL}$. The fifth torque command value $T_{p5}$ limited to the lower limit $T_{pLL}$ becomes a sixth torque command value $T_{p6}$.

When the fifth torque command value $T_{p5}$ is in a range between the upper limit $T_{pUL}$ and the lower limit $T_{pLL}$, the limitation processor 77 does not limit the fifth torque command value $T_{p5}$. The fifth torque command value $T_{p5}$ calculated by the first adder 63I serves as the sixth torque command value $T_{p6}$ without any change.

Setting Pattern of Limit Value

A setting pattern of the upper limit $T_{pUL}$ and the lower limit $T_{pLL}$ is as follows. When the value of the second flag F2 is "0," the fourth set value G4 is set as the fifth set value G5. The fourth set value G4 is, for example, 1." Accordingly, the fifth set value G5 is set to "1." The fifth set value G5 is set as the sixth set value G6 via the gradual change processor 74. Since the fifth set value G5 is 1," the sixth set value G6 is finally "1." The basic limit value $T_{pth}$ stored in the memory is used as the upper limit $T_{pUL}$ without any change. The lower limit $T_{pLL}$ is set by inverting the sign of the upper limit $T_{pUL}$. The third set value G3 is not used to calculate the upper limit $T_{pUL}$.

When the value of the second flag F2 is "1," the third set value G3 is set as the fifth set value G5. When the value of the first flag F1 is "0," the first set value G1 is set as the third set value G3. The first set value G1 is, for example, 1." Accordingly, the fifth set value G5 is set to "1." The fifth set value G5 is set as the sixth set value G6 via the gradual change processor 74. Since the fifth set value G5 is 1," the sixth set value G6 is finally "1." That is, the basic limit value $T_{pth}$ stored in the memory is used as the upper limit $T_{pUL}$ without any change. The lower limit $T_{pLL}$ is set by inverting the sign of the upper limit $T_{pUL}$.

When the value of the second flag F2 is "1," the third set value G3 is set as the fifth set value G5. When the value of the first flag F1 is "1," the second set value G2 is set as the third set value G3. The second set value G2 is greater than the first set value G1. Accordingly, the third set value G3 is set to a value greater than the first set value G1. Since the first set value G1 is 1," the third set value G3 is greater than "1." That is, the third set value G3 with a value greater than "1" is set as the fifth set value G5. The fifth set value G5 is set as the sixth set value G6 via the gradual change processor 74.

Since the fifth set value G5 has a value greater than 1," the sixth set value G6 is finally a value greater than "1." Accordingly, the upper limit $T_{pUL}$ obtained by multiplying the basic limit value $T_{pth}$ by the sixth set value G6 has a value greater than the basic limit value $T_{pth}$. The lower limit $T_{pLL}$ is set by inverting the sign of the upper limit $T_{pUL}$. The absolute value of the lower limit $T_{pLL}$ is greater than the absolute value of the basic limit value $T_{pth}$. Accordingly, in comparison with a case in which the basic limit value $T_{pth}$ is used as the upper limit $T_{pUL}$, the variation range of the fifth torque command value $T_{p5}$ is enlarged.

The second guard processor 63K and the third guard processor 63L basically have the same configuration as the first guard processor 63J. As indicated by a parenthesized reference sign in FIG. 4, the second guard processor 63K uses a seventh set value G7 instead of the second set value G2. The seventh set value G7 is a value specific to the second guard processor 63K. The seventh set value G7 is a fixed value and is set to, for example, a value greater than "1." The basic limit value $T_{pth}$ also serves as a basic limit value for the third torque command value $T_{p3}$.

Accordingly, when the value of the second flag F2 is "0" and when the value of the second flag F2 is "1" and the value of the first flag F1 is "0," the basic limit value $T_{pth}$ is used as the upper limit $T_{pUL}$. The lower limit $T_{pLL}$ is set by inverting the sign of the upper limit $T_p$UL. The variation range of the third torque command value $T_{p3}$ is enlarged in comparison with a case in which the basic limit value $T_{pth}$ is used as the upper limit $T_{pUL}$ when the value of the second flag F2 is "1" and the value of the first flag F1 is "1,"

As indicated by a parenthesized reference sign in FIG. 4, the third guard processor 63L uses an eighth set value G8 instead of the second set value G2. The eighth set value G8 is a value specific to the third guard processor 63L. The eighth set value G8 is a fixed value and is set to, for example, a value greater than "1." The basic limit value $T_{pth}$ also serves as a basic limit value for the fourth torque command value $T_{p4}$.

Accordingly, when the value of the second flag F2 is "0" and when the value of the second flag F2 is "1" and the value of the first flag F1 is "0," the basic limit value $T_{pth}$ is used as the upper limit $T_{pUL}$. The lower limit $T_{pLL}$ is set by inverting the sign of the upper limit $T_{pUL}$. The variation range of the fourth torque command value $T_{p4}$ is enlarged in comparison with a case in which the basic limit value $T_{pth}$ is used as the upper limit $T_{pUL}$ when the value of the second flag F2 is "1" and the value of the first flag F1 is "1,"

Operations in First Embodiment

The operations in the first embodiment will be described below. It is conceivable that the first guard processor 63J, the second guard processor 63K, and the third guard processor 63L use the basic limit value $T_{pth}$ which is a fixed value regardless of the vehicle speed V In this case, for example, there is following concern when the emergency avoidance operation is performed using the steering wheel 5. Herein, attention is paid to the fourth torque command value $T_{p4}$ and the fifth torque command value $T_{p5}$.

Figure 5:
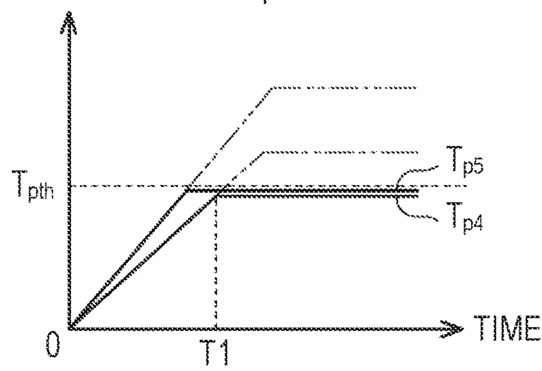
FIG. 5 is a graph illustrating a change with time of a torque command value according to a comparative example.

As illustrated in the graph of FIG. 5, the absolute value of the fourth torque command value $T_{p4}$ calculated by the damping controller 63H and the absolute value of the fifth torque command value $T_{p5}$ calculated by the first adder 63I increase with time and reach the basic limit value $T_{pth}$. For example, the slope of the absolute value of the fifth torque command value $T_{p5}$ is greater than the slope of the absolute value of the fourth torque command value $T_{p4}$. The slope is a rate of change of the absolute value of a torque command value with time. Accordingly, the absolute value of the fourth torque command value $T_{p4}$ reaches the basic limit value $T_{pth}$ later than the absolute value of the fifth torque command value $T_{p5}$ (time T1).

After the absolute value of the fourth torque command value $T_{p4}$ has reached the basic limit value $T_{pth}$, both the absolute value of the fifth torque command value $T_{p5}$ and the absolute value of the fourth torque command value $T_{p4}$ are limited to the basic limit value $T_{pth}$. That is, the absolute value of the fourth torque command value $T_{p4}$ and the absolute value of the fifth torque command value $T_{p5}$ become the same value. The fourth torque command value $T_{p4}$ is a value subtracted by the third subtractor 63N. Accordingly, after the absolute value of the fourth torque command value $T_{p4}$ has reached the basic limit value $T_{pth}$, the fourth torque command value $T_{p4}$ and the fifth torque command value $T_{p5}$ are likely to cancel each other out. Accordingly, there is concern that the turning wheels 6 may not be able to be appropriately turned according to the emergency avoidance operation using the steering wheel 5.

On the other hand, according to this embodiment, when the emergency avoidance operation using the steering wheel 5 is likely to be performed, the variation ranges of the third to fifth torque command values $T_{p3}$ to $T_{p5}$ are enlarged. A case in which the emergency avoidance operation is likely to be performed is, for example, a case in which the vehicle travels at a speed higher than the first vehicle speed threshold value $V_{th1}$ and the second vehicle speed threshold value $V_{th2}$.

In this embodiment, two patterns for enlarging the variation ranges of the third to fifth torque command values $T_{p3}$ to $T_{p5}$ are considered. One of a first pattern and a second pattern is employed according to product specifications.

The first pattern is a pattern of setting the second set value G2 used by the first guard processor 63J, the seventh set value G7 used by the second guard processor 63K, and the eighth set value G8 used by the third guard processor 63L to the same value. Here, all of the second set value G2, the seventh set value G7, and the eighth set value G8 are set to a value greater than "1."

The second pattern is a pattern of setting the second set value G2 used by the first guard processor 63J, the seventh set value G7 used by the second guard processor 63K, and the eighth set value G8 used by the third guard processor 63L to different values. Here, all of the second set value G2, the seventh set value G7, and the eighth set value G8 are set to values greater than "1." At least the second set value G2 out of the second set value G2 and the seventh set value G7 is set to a value greater than the eighth set value G8. This is for more reflecting the first torque command value $T_{p1}$ calculated by the proportional controller 63E in the turning torque command value $T_p$*.

First Pattern

The operations when the first pattern is employed will be described below. Herein, attention is paid to a relationship between the fourth torque command value $T_{p4}$ and the fifth torque command value $T_{p5}$. This is because the fifth torque command value $T_{p5}$ is a value obtained by summing the first torque command value $T_{p1}$ calculated by the proportional controller 63E and the second torque command value $T_{p2}$ calculated by the integral controller 63F and has a greater influence on turning performance of the turning wheels 6. For example, both the second set value G2 and the eighth set value G8 are set to "3."

Figure 6:
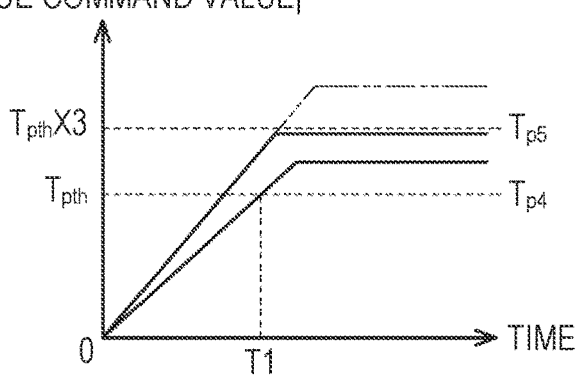
FIG. 6 is a graph illustrating a first example of a change with time of a torque command value according to the first embodiment.

As illustrated in the graph of FIG. 6, the limit value for the absolute value of the fourth torque command value $T_{p4}$ and the limit value for the absolute value of the fifth torque command value $T_{p5}$ are both a value which is three times the basic limit value $T_{pth}$.

The absolute value of the fifth torque command value $T_{p5}$ increases with time. The absolute value of the fifth torque command value $T_{p5}$ exceeds the basic limit value $T_{pth}$ and finally reaches the limit value which is three times the basic limit value $T_{pth}$. After the absolute value of the fifth torque command value $T_{p5}$ has reached the limit value, the absolute value of the fifth torque command value $T_{p5}$ is held in a state in which it is limited to the limit value.

The absolute value of the fourth torque command value $T_{p4}$ increases with time. The absolute value of the fourth torque command value $T_{p4}$ exceeds the basic limit value $T_{pth}$ and is saturated before it reaches the limit value which is three times the basic limit value $T_{pth}$. After the absolute value of the fourth torque command value $T_{p4}$ has been saturated, the absolute value of the fourth torque command value $T_{p4}$ is held at a saturated value between the basic limit value $T_{pth}$ and the limit value which is three times the basic limit value $T_{pth}$.

In this way, the limit value for the absolute value of the fourth torque command value $T_{p4}$ and the limit value for the absolute value of the fifth torque command value $T_{p5}$ both increase to the same value greater than the basic limit value $T_{pth}$. Accordingly, it is possible to avoid limiting the absolute value of the fourth torque command value $T_{p4}$ and the absolute value of the fifth torque command value $T_{p5}$ to the same value. Accordingly, since there occurs a difference between the absolute value of the fourth torque command value $T_{p4}$ and the absolute value of the fifth torque command value $T_{p5}$, it is possible to curb cancelling of the fourth torque command value $T_{p4}$ and the fifth torque command value $T_{p3}$.

Second Pattern

The operations when the second pattern is employed will be described below. Herein, attention is also paid to a relationship between the fourth torque command value $T_{p4}$ and the fifth torque command value $T_{p5}$. For example, both the second set value G2 is set to "5" and the eighth set value G8 is set to "2."

Figure 7:
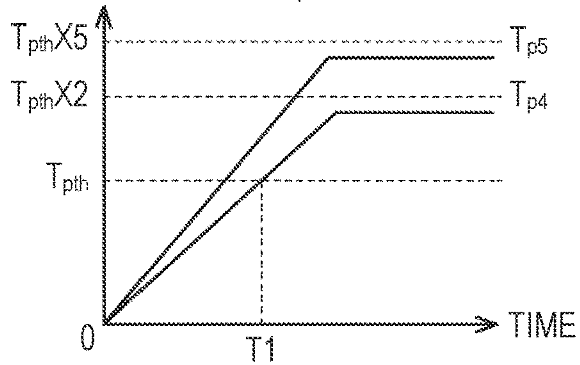
FIG. 7 is a graph illustrating a second example of the change with time of the torque command value according to the first embodiment.

As illustrated in the graph of FIG. 7, the limit value for the absolute value of the fourth torque command value $T_{p4}$ is a value which is two times the basic limit value $T_{pth}$. The limit value for the absolute value of the fifth torque command value $T_{p5}$ is a value which is five times the basic limit value $T_{pth}$.

The absolute value of the fifth torque command value $T_{p5}$ increases with time. The absolute value of the fifth torque command value $T_{p5}$ exceeds the basic limit value $T_{pth}$ and is saturated before it reaches the limit value which is five times the basic limit value $T_{pth}$. After the absolute value of the fifth torque command value $T_{p5}$ has been saturated, the absolute value of the fifth torque command value $T_{p5}$ is held at a saturated value between the basic limit value $T_{pth}$ and the limit value which is five times the basic limit value $T_{pth}$.

The absolute value of the fourth torque command value $T_{p4}$ increases with time. The absolute value of the fourth torque command value $T_{p4}$ exceeds the basic limit value $T_{pth}$ and is saturated before it reaches the limit value which is two times the basic limit value $T_{pth}$. After the absolute value of the fourth torque command value $T_{p4}$ has been saturated, the absolute value of the fourth torque command value $T_{p4}$ is held at a saturated value between the basic limit value $T_{pth}$ and the limit value which is two times the basic limit value $T_{pth}$.

In this way, the limit value for the absolute value of the fourth torque command value $T_{p4}$ and the limit value for the absolute value of the fifth torque command value $T_{p5}$ both increase to different values greater than the basic limit value $T_{pth}$. Accordingly, it is possible to avoid limiting the absolute value of the fourth torque command value $T_{p4}$ and the absolute value of the fifth torque command value $T_{p5}$ to the same value. Accordingly, since there occurs a difference between the absolute value of the fourth torque command value $T_{p4}$ and the absolute value of the fifth torque command value $T_{p5}$, it is possible to curb cancelling of the fourth torque command value $T_{p4}$ and the fifth torque command value $T_{p5}$.

Advantages of First Embodiment

According to the first embodiment, it is possible to achieve the following advantages. The limit value for the fourth torque command value $T_{p4}$ and the limit value for the fifth torque command value $T_{p5}$ increase individually according to the traveling state of the vehicle. For example, when the emergency avoidance operation is likely to be performed using the steering wheel 5, both the limit value for the fourth torque command value $T_{p4}$ and the limit value for the fifth torque command value $T_{p5}$ increase to a value greater than the basic limit value $T_{pth}$. That is, the variation range of the fourth torque command value $T_{p4}$ and the variation range of the fifth torque command value $T_{p5}$ are enlarged. Accordingly, it is possible to avoid limiting the fourth torque command value $T_{p4}$ and the fifth torque command value $T_{p5}$ to the same value. Since there occurs a difference between the fourth torque command value $T_{p4}$ and the fifth torque command value $T_{p5}$, it is possible to curb cancelling of the fourth torque command value $T_{p4}$ and the fifth torque command value $T_{p5}$. The fifth torque command value $T_{p5}$ is a value which is obtained by summing the first torque command value $T_{p1}$ calculated by the proportional controller 63E and the second torque command value $T_{p2}$ calculated by the integral controller 63F and has a greater influence on turning performance of the turning wheels 6. Accordingly, it is possible to appropriately turn the turning wheels 6 according to the emergency avoidance operation using the steering wheel 5.

When the fifth set value G5 which is multiplied by the basic limit value $T_{pth}$ switches between the third set value G3 and the fourth set value G4, a gradual change process is performed on the fifth set value G5 by the gradual change processor 74. Accordingly, it is possible to curb rapid change of the limit value for the third torque command value $T_{p3}$, the limit value for the fourth torque command value $T_{p4}$, and the limit value for the fifth torque command value $T_{p5}$. As a result, it is possible to curb rapid change of the turning torque command value $T_p$* and a turning force generated by the turning motor 31.

When the vehicle speed V exceeds the first vehicle speed threshold value $V_{th1}$ and exceeds the second vehicle speed threshold value $V_{th2}$, the limit value for the absolute value of the fourth torque command value $T_{p4}$ and the limit value for the absolute value of the fifth torque command value $T_{p5}$ both increase to a value greater than the basic limit value $T_{pth}$. The state in which the vehicle is traveling at a speed higher than the first vehicle speed threshold value $V_{th1}$ and higher than the second vehicle speed threshold value $V_{th2}$ is one of the vehicle states in which the emergency avoidance operation is likely to be performed. Accordingly, it is possible to enlarge the variation range of the limit value for the absolute value of the fourth torque command value $T_{p4}$ and the variation range of the limit value for the absolute value of the fifth torque command value $T_{p5}$ according to the vehicle state.

When the second pattern for enlarging a variation range of a limit value is employed and when the vehicle speed V exceeds the first vehicle speed threshold value $V_{th1}$ and exceeds the second vehicle speed threshold value $V_{th2}$, the limit value for the fifth torque command value $T_{p5}$ is set to a value greater than the limit value for the fourth torque command value $T_{p4}$. Accordingly, it is possible to more reflect the first torque command value $T_{p1}$ calculated by the proportional controller 63E and the second torque command value $T_{p2}$ calculated by the integral controller 63F in addition to the fifth torque command value $T_{p5}$ calculated by the first adder 63I in the turning torque command value $T_p$*.

Second Embodiment

A turning control device according to a second embodiment will be described below. This embodiment basically employs the same configuration as the first embodiment illustrated in FIGS. 1, 2, and 4. This embodiment is different from the first embodiment in the configuration of the pinion angle feedback controller 63. Accordingly, the same elements as in the first embodiment will be referred to by the same reference signs and detailed description thereof will be omitted.

As illustrated in FIG. 8, the pinion angle feedback controller 63 includes a first subtractor 63A, a first differentiator 63B, a second differentiator 63C, and a second subtractor 63D. The pinion angle feedback controller 63 further includes a proportional controller 63E, an integral controller 63F, a differential controller 63G, and a damping controller 63H. The pinion angle feedback controller 63 further includes a second guard processor 63K and a third guard processor 63L.

In addition to these elements, the pinion angle feedback controller 63 includes a fifth guard processor 63P, a sixth guard processor 63Q, a calculator 63R, and a seventh guard processor 63S.

The fifth guard processor 63P and the sixth guard processor 63Q have the same configuration as the first adder 63I, the first guard processor 63J, the second guard processor 63K, and the third guard processor 63L illustrated in FIG. 4.

The fifth guard processor 63P receives the first torque command value $T_{p1}$ calculated by the proportional controller 63E and the vehicle speed V detected by the vehicle speed sensor 41. The fifth guard processor 63P calculates a limit value for the first torque command value $T_{p1}$ based on the vehicle speed V. The limit value includes an upper limit and a lower limit for the first torque command value $T_{p1}$. The fifth guard processor 63P performs a limitation process on the first torque command value $T_{p1}$ based on the upper limit and the lower limit. The fifth guard processor 63P calculates an eleventh torque command value $T_{p11}$ by performing the limitation process.

As indicated by a parenthesized reference sign in FIG. 4, the fifth guard processor 63P uses a ninth set value G9 instead of the second set value G2. The ninth set value G9 is a value specific to the fifth guard processor 63P. The ninth set value G9 is a fixed value and is set to, for example, a value greater than "1." The basic limit value $T_{pth}$ also serves as a basic limit value for the first torque command value $T_{p1}$.

The sixth guard processor 63Q receives the second torque command value $T_{p2}$ calculated by the integral controller 63F and the vehicle speed V detected by the vehicle speed sensor 41. The sixth guard processor 63Q calculates a limit value for the second torque command value $T_{p2}$ based on the vehicle speed V. The limit value includes an upper limit and a lower limit for the second torque command value $T_{p2}$. The sixth guard processor 63Q performs a limitation process on the second torque command value $T_{p2}$ based on the upper limit and the lower limit. The sixth guard processor 63Q calculates a twelfth torque command value $T_{p12}$ by performing the limitation process.

As indicated by a parenthesized reference sign in FIG. 4, the sixth guard processor 63Q uses a tenth set value G10 instead of the second set value G2. The tenth set value G10 is a value specific to the sixth guard processor 63Q. The tenth set value G10 is a fixed value and is set to, for example, a value greater than "1." The basic limit value $T_{pth}$ also serves as a basic limit value for the second torque command value $T_{p2}$.

The calculator 63R receives the eleventh torque command value $T_{p11}$ calculated by the fifth guard processor 63P, the twelfth torque command value $T_{p12}$ calculated by the sixth guard processor 63Q, the seventh torque command value $T_{p7}$ calculated by the second guard processor 63K, and the eighth torque command value $T_{p8}$ calculated by the third guard processor 63L. The calculator 63R calculates a thirteenth torque command value $T_{p13}$ by summing the eleventh torque command value $T_{p11}$, the twelfth torque command value $T_{p12}$, and the seventh torque command value $T_{p7}$ and subtracting the eighth torque command value $T_{p8}$ from the summed value.

The seventh guard processor 63S receives the thirteenth torque command value $T_{p13}$ calculated by the calculator 63R. The seventh guard processor 63S includes a limit value for the thirteenth torque command value $T_{p13}$. The limit value includes an upper limit and a lower limit for the thirteenth torque command value $T_{p13}$. The seventh guard processor 63S performs a limitation process on the thirteenth torque command value $T_{p13}$ based on the upper limit and the lower limit. The seventh guard processor 63S calculates a final turning torque command value $T_p$* used to control the turning motor 31 by performing the limitation process.

The fifth guard processor 63P and the sixth guard processor 63Q constitute a third processor. The calculator 63R constitutes a fourth processor. According to the second embodiment, it is possible to achieve following advantages in addition to the advantages in the first embodiment.

The limit values for the absolute values of the first to fourth torque command values $T_{p1}$ to $T_{p4}$ increase individually according to the traveling state of the vehicle. For example, when the emergency avoidance operation is likely to be performed using the steering wheel 5, the limit values for the absolute values of the first to fourth torque command values $T_{p1}$ to $T_{p4}$ increase to different values greater than the basic limit value $T_{pth}$. That is, the variation ranges of the first to fourth torque command values $T_{p1}$ to $T_{p4}$ are enlarged.

Accordingly, it is possible to avoid limiting the absolute values of the first to third torque command values $T_{p1}$ to $T_{p3}$ and the absolute value of the fourth torque command value $T_{p4}$ to the same value. As a result, since there occurs a difference between the absolute values of the first to third torque command values $T_{p1}$ to $T_{p3}$ and the absolute values of the fourth torque command value $T_{p4}$, it is possible to curb cancelling of the absolute values of the first to third torque command values $T_{p1}$ to $T_{p3}$ and the absolute value of the fourth torque command value $T_{p4}$. Particularly, since cancelling of the first torque command value $T_{p1}$ and the fourth torque command value $T_{p4}$ is avoided, it is possible to appropriately turn the turning wheels 6 according to the emergency avoidance operation using the steering wheel 5.

Third Embodiment

A turning control device according to a third embodiment will be described below. This embodiment basically employs the same configuration as the first embodiment illustrated in FIGS. 1, 2, and 4. This embodiment is different from the first embodiment in the configuration of the setting unit 71 of the pinion angle feedback controller 63. Accordingly, the same elements as in the first embodiment will be referred to by the same reference signs and detailed description thereof will be omitted. This embodiment may be applied to the second embodiment illustrated in FIG. 8.

The setting unit 71 illustrated in FIG. 4 calculates the third set value G3 using a map. The map is stored in the memory. When the first pattern for enlarging the variation ranges of the third to fifth torque command values $T_{p3}$ to $T_{p5}$ is used, the setting units 71 of the first guard processor 63J, the second guard processor 63K, and the third guard processor 63L use a first map.

Figure 9:
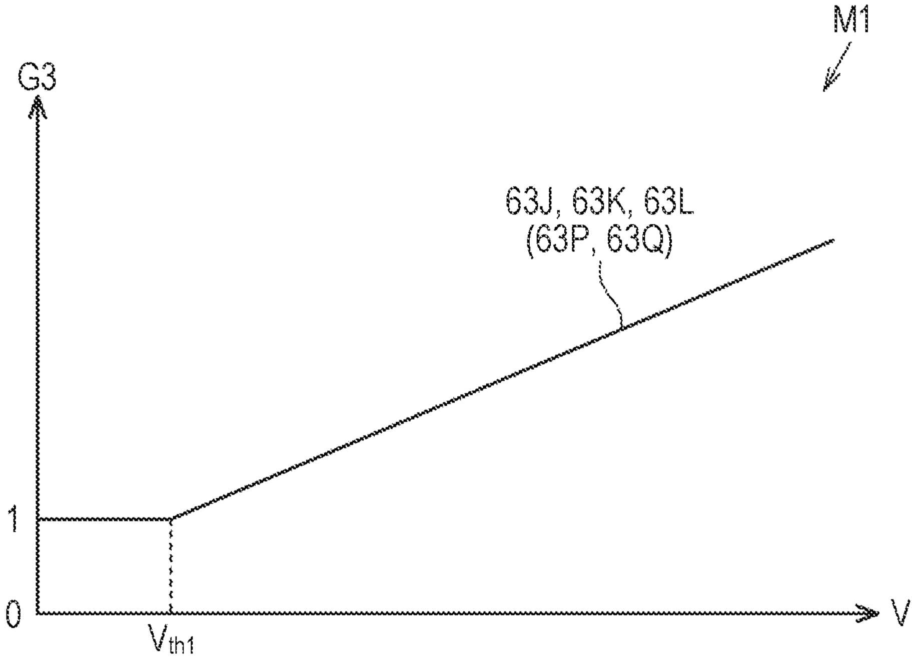
FIG. 9 is a graph illustrating a first map which is used by a setting unit according to a third embodiment.

As illustrated in FIG. 9, the first map M1 is a map in which the horizontal axis is set to the vehicle speed V and the vertical axis is set to the third set value G3 and defines a relationship between the vehicle speed V and the third set value G3. The first map M1 has the following characteristics. That is, in a range from a value "0" of the vehicle speed V to the first vehicle speed threshold value $V_{th1}$, a dead zone in which the third set value G3 is "1" is set. When the value of the vehicle speed V is greater than the first vehicle speed threshold value $V_{th1}$, the third set value G3 increases linearly with an increase of the value of the vehicle speed V.

Accordingly, after the value of the vehicle speed V has exceeded the first vehicle speed threshold value $V_{th1}$, the limit value for the third torque command value $T_{p3}$, the limit value for the fourth torque command value $T_{p4}$, and the limit value of the fifth torque command value $T_{p5}$ all increase to the same value greater than the basic limit value $T_{pth}$. As the value of the vehicle speed V increases, the limit value for the third torque command value $T_{p3}$, the limit value for the fourth torque command value $T_{p4}$, and the limit value of the fifth torque command value $T_{p5}$ increase.

When this embodiment is applied to the second embodiment, the setting units 71 of the fifth guard processor 63P and the sixth guard processor 63Q also use the first map M1 illustrated in FIG. 9.

When the second pattern for enlarging the variation ranges of the third to fifth torque command values $T_{p3}$ to $T_{p5}$ is used, the setting units 71 of the first guard processor 63J, the second guard processor 63K, and the third guard processor 63L use a second map. The second map used for the setting units 71 has different characteristics.

Figure 10:
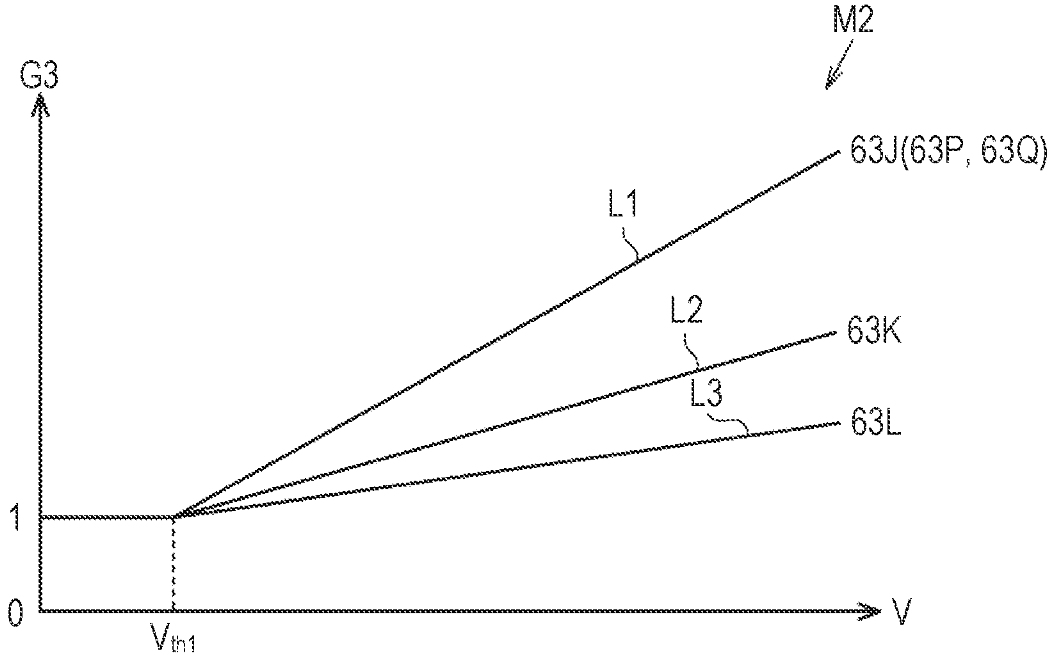
FIG. 10 is a graph illustrating a second map which is used by a setting unit according to the second embodiment.

As illustrated in FIG. 10, the second map M2 is a map in which the horizontal axis is set to the vehicle speed V and the vertical axis is set to the third set value G3 and defines a relationship between the vehicle speed V and the third set value G3. The second map M2 used by the setting unit 71 of the first guard processor 63J has the following characteristics. That is, as indicated by a characteristic line L1, a dead zone in which the third set value G3 is "1" is set in a range from a value "0" of the vehicle speed V to the first vehicle speed threshold value $V_{th1}$. When the value of the vehicle speed V is greater than the first vehicle speed threshold value $V_{th1}$, the third set value G3 increases linearly with an increase of the value of the vehicle speed V.

The second map M2 used by the setting unit 71 of the second guard processor 63K has the following characteristics. That is, as indicated by a characteristic line L2, a dead zone in which the third set value G3 is "1" is set in a range from a value "0" of the vehicle speed V to the first vehicle speed threshold value $V_{th1}$. When the value of the vehicle speed V is greater than the first vehicle speed threshold value $V_{th1}$, the third set value G3 increases linearly with an increase of the value of the vehicle speed V. The slope of the characteristic line L2 after the value of the vehicle speed V has exceeded the first vehicle speed threshold value $V_{th1}$ is less than the slope of the characteristic line L1 after the value of the vehicle speed V has exceeded the first vehicle speed threshold value $V_{th1}$. The slope is a rate of change of the third set value G3 with respect to the vehicle speed V.

The second map M2 used by the setting unit 71 of the third guard processor 63L has the following characteristics. That is, as indicated by a characteristic line L3, a dead zone in which the third set value G3 is "1" is set in a range from a value "0" of the vehicle speed V to the first vehicle speed threshold value $V_{th1}$. When the value of the vehicle speed V is greater than the first vehicle speed threshold value $V_{th1}$, the third set value G3 increases linearly with an increase of the value of the vehicle speed V. The slope of the characteristic line L3 after the value of the vehicle speed V has exceeded the first vehicle speed threshold value $V_{th1}$ is less than the slope of the characteristic line L2 after the value of the vehicle speed V has exceeded the first vehicle speed threshold value $V_{th1}$.

Accordingly, after the value of the vehicle speed V has exceeded the first vehicle speed threshold value $V_{th1}$ the limit value for the third torque command value $T_{p3}$, the limit value for the fourth torque command value $T_{p4}$, and the limit value of the fifth torque command value $T_{p5}$ all increase to different values greater than the basic limit value $T_{pth}$. With an increase of the value of the vehicle speed V, the limit value for the third torque command value $T_{p3}$, the limit value for the fourth torque command value $T_{p4}$, and the limit value of the fifth torque command value $T_{p5}$ increase.

When this embodiment is applied to the second embodiment, the second map M2 used by the setting units 71 of the fifth guard processor 63P and the sixth guard processor 63Q have, for example, characteristics indicated by the characteristic line L1 in FIG. 10.

Advantages of Third Embodiment

According to the third embodiment, it is possible to achieve the following advantages in addition to the advantages of the first embodiment and the second embodiment.

When the value of the vehicle speed V is greater than the first vehicle speed threshold value $V_{th1}$, the limit value for the third torque command value $T_{p3}$, the limit value for the fourth torque command value $T_{p4}$, and the limit value of the fifth torque command value $T_{p5}$ increase with an increase of the value of the vehicle speed V. Accordingly, it is possible to appropriately increase the limit value for the third torque command value $T_{p3}$, the limit value for the fourth torque command value $T_{p4}$, and the limit value of the fifth torque command value $T_{p5}$ according to the vehicle speed V. As the vehicle speed V increases, it is necessary to appropriately turn the turning wheels 6 according to an emergency avoidance operation using the steering wheel 5.

OTHER EMBODIMENTS

The aforementioned embodiments may be modified as follows. The sixth guard processor 63Q for the second torque command value $T_{p2}$ calculated by the integral controller 63F in the second embodiment may be configured not to change the limit value for the second torque command value $T_{p2}$ according to the vehicle speed V In this case, the sixth guard processor 63Q limits the second torque command value $T_{p2}$, for example, using the basic limit value $T_{pth}$ regardless of the vehicle speed V.

In the first to third embodiments, the pinion angle feedback controller 63 may employ a configuration in which the fourth guard processor 63O is omitted. In this case, the tenth set value G10 calculated by the third subtractor 63N serves as the final turning torque command value $T_p^*$ used to control the turning motor 31.

In the first to third embodiments, the pinion angle feedback controller 63 may employ a configuration in which the differential controller 63G and the second guard processor 63K are omitted. In this case, the first differentiator 63B, the second subtractor 63D, and the second adder 63M can be omitted. The third subtractor 63N receives the sixth torque command value $T_{p6}$ calculated by the first guard processor 63J.

In the first to third embodiments, the guard processors (63J, 63K, 63L, 63P, and 63Q) may employ a configuration in which the gradual change processor 74 is omitted. In this case, the multiplier 75 receives the fifth set value G5 set by the second switch 73.

In the first to third embodiments, the first vehicle speed threshold value $V_{th1}$ and the second vehicle speed threshold value $V_{th2}$ can be appropriately changed. The first vehicle speed threshold value $V_{th1}$ and the second vehicle speed threshold value $V_{th2}$ may be speeds in a middle-speed range or speeds in a high-speed range. The middle-speed range is, for example, a speed range equal to or higher than 40 km/h and lower than 60 km/h. The high-speed range is, for example, a speed range equal to or higher than 60 km/h. That is, the first vehicle speed threshold value $V_{th1}$ and the second vehicle speed threshold value $V_{th2}$ may be set to, for example, speeds in a range from 20 km/h to 100 km/h.

In the first to third embodiments, the vehicle speed V may be a speed calculated based on vehicle wheel speeds detected by vehicle wheel speed sensors. The vehicle speed V may be a speed based on a signal other than the vehicle wheel speeds. For example, the vehicle speed V may be a vehicle body speed detected by a vehicle body speed sensor. The vehicle body speed is a speed of a vehicle body relative to a road surface. When the vehicle body speed is used, an influence of slip of wheels can be excluded. The first determination unit 71A in FIG. 4 may receive the speed based on the vehicle wheel speeds and the second determination unit 72 may receive the vehicle body speed.

In the first to third embodiments, the limit values of the torque command values ($T_{p3}$, $T_{p4}$, and $T_{p5}$ or $T_{p1}$, $T_{p2}$, $T_{p3}$, and $T_{p4}$) may be changed based on other vehicle state parameters B1 to B4 instead of the vehicle speed V or in addition to the vehicle speed V. The traveling state of the vehicle is reflected in the vehicle state parameters B1 to B4. The traveling state of the vehicle includes, for example, vehicle behavior following the emergency avoidance operation. With the emergency avoidance operation, the values of the vehicle state parameters B1 to B4 increase. This is because an amount of operation of the steering wheel 5 and a steering speed at the time of performing of the emergency avoidance operation increase rapidly. For example, the first determination unit 71A and the second determination unit 72 determine that the emergency avoidance operation is likely to be performed when the values of the vehicle state parameters B1 to B4 are greater than predetermined threshold values.

Examples of the vehicle state parameter include B1. yaw rate, B2. lateral acceleration, B3. value of ratio ($\theta_p^*/\theta_p$) between target pinion angle $\theta_p^*$ and actual pinion angle $\theta_p$, and B4. value of ratio ($\omega_p^*/\omega_p$) between target pinion angular velocity $\omega_p^*$ and actual pinion angular velocity $\omega_p$. The yaw rate is detected, for example, by a yaw rate sensor mounted in the vehicle. The lateral acceleration is detected by a lateral acceleration sensor mounted in the vehicle.

What is claimed is:

1. A turning control device for controlling a turning motor that generates a turning force for turning wheels of a vehicle, the turning control device calculates a target angle of a rotary member rotating along with an operation of the turning wheels based on a steering state of a steering wheel and calculates a turning torque command value for the turning motor by performing feedback control such that an actual angle of the rotary member conforms to the target angle, the turning control device comprising:

- a first processor configured to calculate a torque command value based on a difference between the target angle and the actual angle;
- a second processor is a damping controller that outputs a compensation value for the torque command value;
- a third processor configured to perform a limitation process to limit a variation range of the torque command value based on a limit value of the torque command value and to limit a variation range of the compensation value based on a limit value of the compensation value; and
- a fourth processor configured to calculate the turning torque command value using the torque command value after the limitation process is performed and the compensation value after the limitation process is performed,
- wherein the turning torque command value from the fourth processor is sent to the turning motor to generate the turning force to turn the wheels of the vehicle, and
- wherein the third processor is configured to individually increase the limit value of the torque command value and the limit value of the compensation value based on a traveling state of the vehicle.

2. The turning control device according to claim 1, wherein the third processor is configured to increase the limit value of the torque command value and the limit value of the compensation value when a value of a vehicle state parameter is greater than a predetermined threshold value, the vehicle state parameter is a parameter in which the traveling state of the vehicle is reflected.

3. The turning control device according to claim 2, wherein the third processor is configured to increase the limit value of the torque command value and the limit value of the compensation value to the same value when the value of the vehicle state parameter is greater than the threshold value.

4. The turning control device according to claim 2, wherein the third processor is configured to increase the limit value of the torque command value and the limit value of the compensation value to different values when the value of the vehicle state parameter is greater than the threshold value.

5. The turning control device according to claim 4, wherein the limit value of the torque command value is greater than the limit value of the compensation value.

6. The turning control device according to claim 2, wherein the third processor is configured to increase the limit value of the torque command value and the limit value of the compensation value with an increase in the value of the vehicle state parameter, when the value of the vehicle state parameter is greater than the threshold value.

7. The turning control device according to claim 2, wherein the value of the vehicle state parameter is a value of a vehicle speed detected by an onboard sensor, a value of a yaw rate, a value of a ratio of the actual angle to the target angle, or a value of a ratio of the actual angular velocity to the target angular velocity.

8. The turning control device according to claim 2, wherein the third processor is configured to determine that an emergency avoidance operation using the steering wheel is likely to be performed, when the value of the vehicle state parameter is greater than the threshold value.

9. The turning control device according to claim 1, wherein the third processor includes a gradual change processor configured to gradually change the limit value of the torque command value and the limit value of the compensation value with time by performing a gradual change process on the limit value of the torque command value and the limit value of the compensation value.

10. The turning control device according to claim 1, wherein the torque command value includes a first torque command value with a value proportional to the difference and a second torque command value with a value proportional to an integral value of the difference, the first torque command value is calculated by performing a proportional operation on the difference, the second torque command value is calculated by performing an integral operation on the difference and the third processor is configured to limit a variation range of a summed value of the first torque command value and the second torque command value based on a limit value of the summed value.

11. The turning control device according to claim 1, wherein the torque command value includes a first torque command value with a value proportional to the difference and a second torque command value with a value proportional to an integral value of the difference, the first torque command value is calculated by performing a proportional operation on the difference, the second torque command value is calculated by performing an integral operation on the difference, and the third processor is configured to limit a variation range of the first torque command value based on a limit value of the first torque command value and limit a variation range of the second torque command value based on a limit value of the second torque command value.

* * * * *